(12) United States Patent
Yamagishi (10) Patent No.: US 9,334,809 B2
(45) Date of Patent: May 10, 2016

(54) THROTTLE BODY STRUCTURE

(71) Applicant: HONDA MOTOR CO., LTD., Tokyo (JP)

(72) Inventor: Naoto Yamagishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 317 days.

(21) Appl. No.: 13/975,759

(22) Filed: Aug. 26, 2013

(65) Prior Publication Data

US 2014/0060483 A1 Mar. 6, 2014

(30) Foreign Application Priority Data

Aug. 29, 2012 (JP) ................................ 2012-188317

(51) Int. Cl.
| | |
|---|---|
| *F02M 69/32* | (2006.01) |
| *F02D 9/02* | (2006.01) |
| *F02D 9/10* | (2006.01) |
| *F02D 31/00* | (2006.01) |
| *F02D 41/00* | (2006.01) |
| *F02D 41/08* | (2006.01) |

(52) U.S. Cl.
CPC *F02D 9/02* (2013.01); *F02D 9/109* (2013.01); *F02D 9/1055* (2013.01); *F02D 31/003* (2013.01); *F02D 31/005* (2013.01); *F02D 41/0002* (2013.01); *F02M 69/32* (2013.01); F02D 41/08 (2013.01); Y02T 10/42 (2013.01)

(58) Field of Classification Search
CPC ............... F02D 9/02; F02D 9/08; F02D 9/10; F02D 9/105; F02D 9/1055; F02D 9/109; F02D 2009/0201; F02D 2009/0205; F02D 2009/0279; F02D 31/0005; F02D 31/003; F02D 41/08; F02D 41/16; F02M 69/30–69/32; F02M 3/12

USPC ............ 123/336, 339.1, 339.23, 179.18, 337, 123/432, 472
See application file for complete search history.

(56) References Cited

U.S. PATENT DOCUMENTS

| | | | | | |
|---|---|---|---|---|---|
| 4,946,631 | A | * | 8/1990 | Buford | F02M 1/043 261/121.4 |
| 6,334,430 | B1 | * | 1/2002 | Itabashi | F02D 9/1065 123/336 |
| 6,415,765 | B1 | * | 7/2002 | Akagi | F02B 61/02 123/336 |
| 7,069,920 | B2 | * | 7/2006 | Gamberini | F02D 9/109 123/184.53 |
| 7,231,899 | B2 | * | 6/2007 | Wakamori | F02D 9/1055 123/184.21 |
| 7,263,969 | B2 | * | 9/2007 | Sakamoto | F02M 23/001 123/336 |
| 7,267,099 | B2 | * | 9/2007 | Takahashi | F02D 9/1055 123/184.21 |
| 7,302,929 | B2 | * | 12/2007 | Kondo | F02D 9/1095 123/336 |
| 7,383,814 | B2 | * | 6/2008 | Takahashi | F02D 9/1055 123/184.21 |

FOREIGN PATENT DOCUMENTS

JP    2007-132235    5/2007

* cited by examiner

*Primary Examiner* — Lindsay Low
*Assistant Examiner* — Michael A Kessler
(74) *Attorney, Agent, or Firm* — Rankin, Hill & Clark LLP (57) ABSTRACT

A throttle body structure includes a plurality of throttle bores, an idle air control valve that is provided between the throttle bores, a plurality of bypass passages that extend toward a downstream side of the throttle bores, and bypass ports that are arranged between the throttle bores and supply idle air to throttle bores which are spaced apart from the idle air control valve. Compound bypass passages and third bypass passages are arranged parallel to each other. The third bypass passages communicate with the throttle bores arranged adjacent to the idle air control valve, and the compound bypass passages communicate with the bypass ports.

6 Claims, 9 Drawing Sheets

THROTTLE BODY STRUCTURE

BACKGROUND OF THE INVENTION

1. Field of the Invention

The present invention relates to the throttle body structure having an idle air control valve and a plurality of bypass passages.

2. Description of Related Art

A multi-cylinder throttle body on which a housing of an idle air control valve is integrally formed is known (see JP-A-2007-132235, for example). JP-A-2007-132235 discloses the throttle body structure that includes an insertion hole for an idle air control valve and an approximately Y-shaped bypass passage formed on a plane orthogonal to the insertion hole between throttle bores formed in the throttle body in parallel to each other. The approximately Y-shaped bypass passage communicates with a bypass port that supplies idle air to a pair of throttle bores arranged adjacent to the idle air control valve and other throttle bores that are spaced apart from the idle air control valve. Air in the bypass port is supplied to the above-mentioned other throttle bores through hoses.

The above-mentioned prior art fails to disclose the arrangement of parts around the throttle body. When an injector is provided as a part arranged around the throttle body, for example, a fuel delivery pipe, a fuel supply hose and the like, which are connected to the injector, are arranged upstream of the throttle bore. Accordingly, in providing the bypass port upstream of the throttle body and by arranging hoses or the like, which are connected to other throttle bores spaced apart from the bypass port as in the case of the above-mentioned prior art, there exists a drawback that these parts are jammed with respect to an arrangement space so that the degree of freedom of arrangement of the parts such as the hoses, the injector, the fuel delivery pipe and fuel hoses is lowered.

SUMMARY OF THE INVENTION

The present invention has been made in view of the above-mentioned circumstances, and it is an object of the invention to enhance the degree of freedom of the arrangement of parts arranged outside a throttle body in the throttle body structure where an idle air control valve is integrally formed on the throttle body, and a bypass passage for idle air, which communicates with another throttle body spaced apart from the idle air control valve, is provided.

In accordance with the present invention, a throttle body structure includes: a plurality of throttle bores where at least two or more throttle valves are arranged parallel to each other; an idle air control valve that is provided between the plurality of throttle bores; a plurality of bypass passages that are opened or closed by the idle air control valve and extend toward a downstream side of the throttle bores; and bypass ports that are arranged between the plurality of throttle bores where the idle air control valve is arranged and supply idle air to throttle bores that are spaced apart from the idle air control valve. The plurality of bypass passages are arranged parallel to each other, one bypass passage of the bypass passages communicate with the throttle bores arranged adjacent to the idle air control valve, and the other bypass passages communicate with the bypass ports.

In further accordance with the present invention, a plurality of bypass passages can be easily formed in a compact manner, and it is also possible to make the other bypass passage, which extends toward the downstream side, communicate with the bypass port so that the bypass port can be easily provided on a downstream side of the throttle bore. Accordingly, the degree of freedom in arranging parts to be arranged outside the throttle body is increased.

In further accordance with the present invention, the plurality of bypass passages include: first bypass passages that extend toward a downstream side of the throttle bores from a control valve accommodating hole in which the idle air control valve is accommodated; second bypass passages that are provided on the same axis as the first bypass passages and extend toward an upstream side of the throttle bores from the control valve accommodating hole; and third bypass passages that extend parallel to the first bypass passages. The second and third bypass passages communicate with each other.

The first bypass passages and the second bypass passages can be easily formed, and it is also possible to make bypass air that flowed into the upstream side of the throttle bore through the second bypass passages flow toward the downstream side through the third bypass passages and, hence, the bypass passages can be easily formed in a compact manner.

In further accordance with the present invention, communication passages extending parallel to the throttle bores and communicating with the second bypass passages are provided at positions upstream of the throttle body. The third bypass passages communicate with the communication passage.

Therefore, even when the third bypass passages are arranged close to the first bypass passages, the third bypass passages can communicate with the second bypass passages through the communication passage without interfering with the control valve accommodating hole, so that the bypass passages can be formed in a compact manner. The communication passages are formed together with the throttle bores as as-cast holes during casting. Thus, the communication passages can be easily formed.

In further accordance with the present invention, the third bypass passages communicate with the throttle bores arranged adjacent to the idle air control valve, and an idle screw air passage is provided between the throttle bores and the communication passages and parallel to the throttle bores. The idle screw air passage can be formed in a compact manner so that a size of the throttle body can be reduced.

The control valve accommodating hole and the bypass ports are formed parallel to each other as an as-cast hole during casting. Thus, the control valve accommodating hole and the bypass port can be easily formed in a compact manner so that a size of the throttle body can be reduced.

In further accordance with the present invention, an injector that injects fuel to the throttle bores is mounted on the respective throttle bores formed in the throttle body, a delivery pipe that supplies fuel to the injector is provided, and the bypass ports are arranged more downstream of the throttle body than is the delivery pipe. Thus, the bypass port does not interfere with the arrangement of the delivery pipe so that it is possible to increase the degree of freedom in arranging the delivery pipe.

A plurality of bypass passages can be easily formed in a compact manner, and the bypass port can be also easily provided on a downstream side of the throttle bore and hence, it is possible to increase the degree of freedom in arranging parts arranged outside the throttle body. The first bypass passages and the second bypass passages can be easily formed, and it is also possible to make bypass air, which has flowed into the upstream side of the throttle bore through the second bypass passages, to flow toward the downstream side through the third bypass passages and, hence, the bypass passages can be easily formed in a compact manner. Even when the third bypass passages are arranged close to the first bypass passages, the third bypass passages can communicate with the second bypass passages through the communication passages without interfering with the control valve accommodating hole so that the bypass passages can be formed in a compact manner.

The present invention provides numerous advantages. For example, the communication passage can be easily formed. The idle screw air passage can be formed in a compact manner so that a size of the throttle body can be reduced. The control valve accommodating hole and the bypass port can be easily formed in a compact manner so that a size of the throttle body can be reduced. It is possible to increase the degree of freedom in arranging the delivery pipe.

DETAILED DESCRIPTION OF THE PREFERRED EMBODIMENTS

Hereinafter, the throttle body structure according to an embodiment of the invention is explained in conjunction with drawings. Here, in the explanation, unless otherwise specified, the directions of front and rear, left and right, and up and down agree with the corresponding directions of a vehicle body. Further, in the drawings, symbol FR indicates a front side of the vehicle body, symbol UP indicates an upper side of the vehicle body, and symbol LE indicates a left side of the vehicle body.

Figure 1:
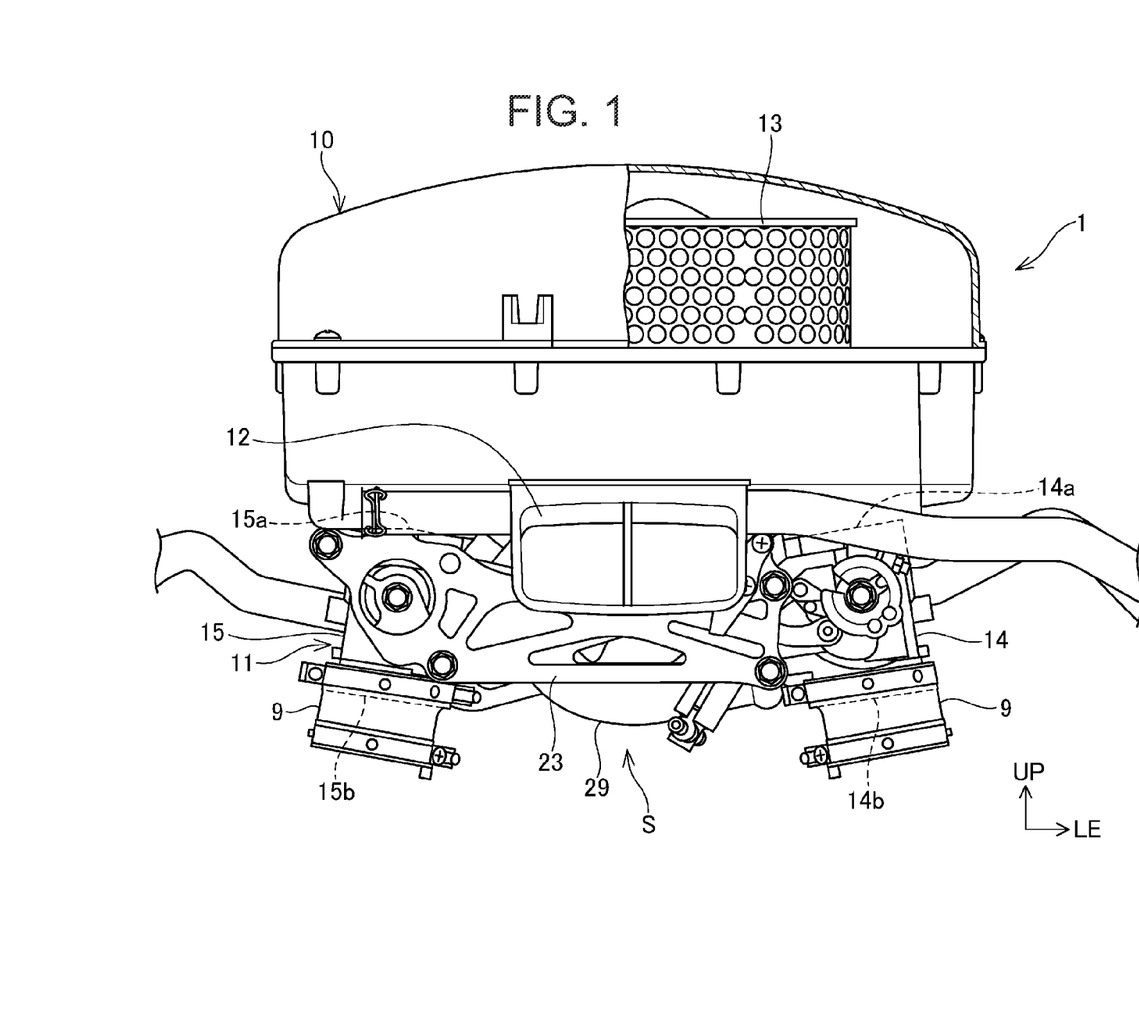
FIG. 1 is a front view of an air intake device according to an embodiment of the invention.

With reference to FIG. 1, the air intake device 1 is connected to a so-called vertical engine (not shown in the drawing) where a crankshaft (not shown in the drawing) is arranged in an extending manner in the longitudinal direction of a vehicle. This engine is a V-type, 4-cylinder, 4-stroke engine which is mounted on a motorcycle, wherein one bank (not shown in the drawing) of two cylinders is arranged on a left side of the vehicle, and the other bank (not shown in the drawing) of two cylinders is arranged on a right side of the vehicle.

The air intake device 1, which is arranged above the engine, includes: an air cleaner box 10 that takes in air to be supplied to the engine and purifies air; and a throttle body device 11, which is arranged downstream of the air cleaner box 10, mixes fuel supplied from a fuel tank (not shown in the drawing) and air supplied from the air cleaner box 10 together, and supplies air-fuel mixture to the engine.

The air cleaner box 10 is provided with an intake port 12 through which outside air is taken at a front portion thereof, and an air filter 13 that purifies air taken through the intake port 12 in the inside thereof.

The throttle body 11 includes one (left) throttle body 14 connected to one (left) bank, and the other (right) throttle body 15 connected to the other (right) bank. Upstream ends 14a, 15a constituting air intake ports of the throttle body 14 and the throttle body 15 are connected to a lower surface of the air cleaner box 10, and downstream ends 14b, 15b are connected to an engine side are positioned below the upstream ends 14a, 15a. A connecting tube 9, which is connected to the engine side, is mounted on the downstream ends 14b, 15b respectively.

Figure 2:
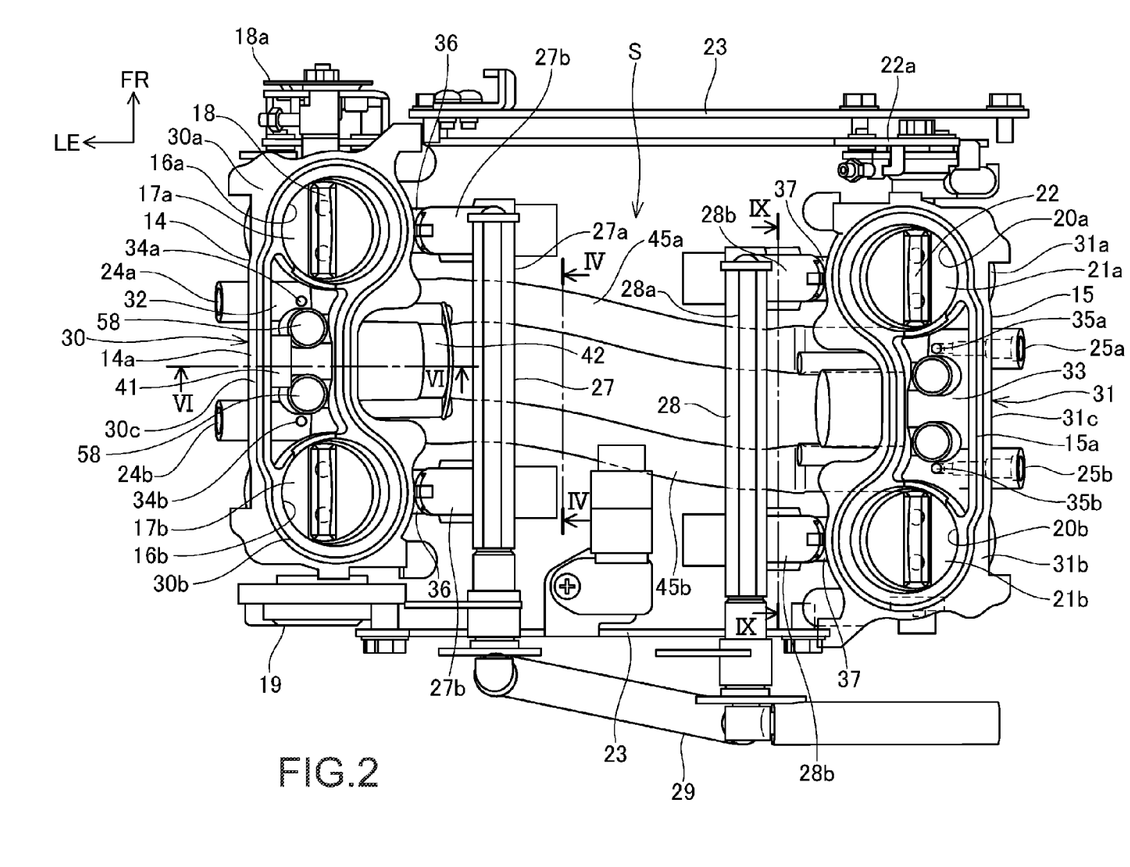
FIG. 2 is a plan view of throttle bodies as viewed from above.
Figure 3:
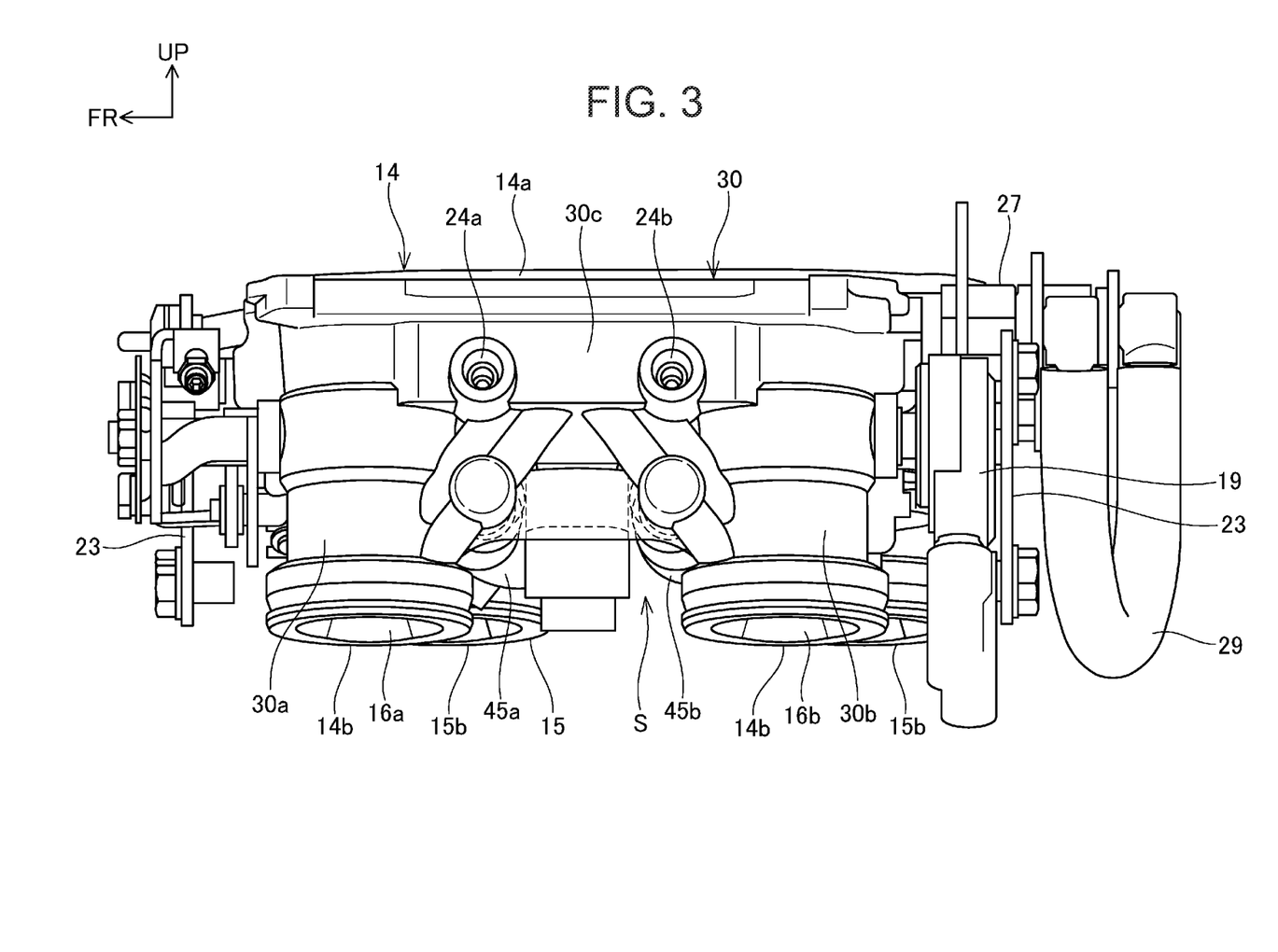
FIG. 3 is a side view of the throttle body as viewed from a left side.

FIG. 2 is a plan view of the throttle body 14 and the throttle body 15 as viewed from above. FIG. 3 is a side view of the throttle body 14 as viewed from a left side.

As shown in FIG. 2 and FIG. 3, the throttle body 14 includes a pair of throttle bores 16a, 16b, which is connected to cylinders of one bank, respectively, as integral parts thereof. That is, with respect to the throttle body 14, in a throttle body main portion 30 made of a light alloy such as an aluminum alloy, the plurality of throttle bores 16a, 16b are formed parallel to each other in a penetrating manner.

The throttle body main portion 30 includes cylinder portions 30a, 30b in which the throttle bores 16a, 16b are formed, and a block-shaped connecting portion 30c which connects the cylinder portions 30a, 30b to each other.

Figure 7:
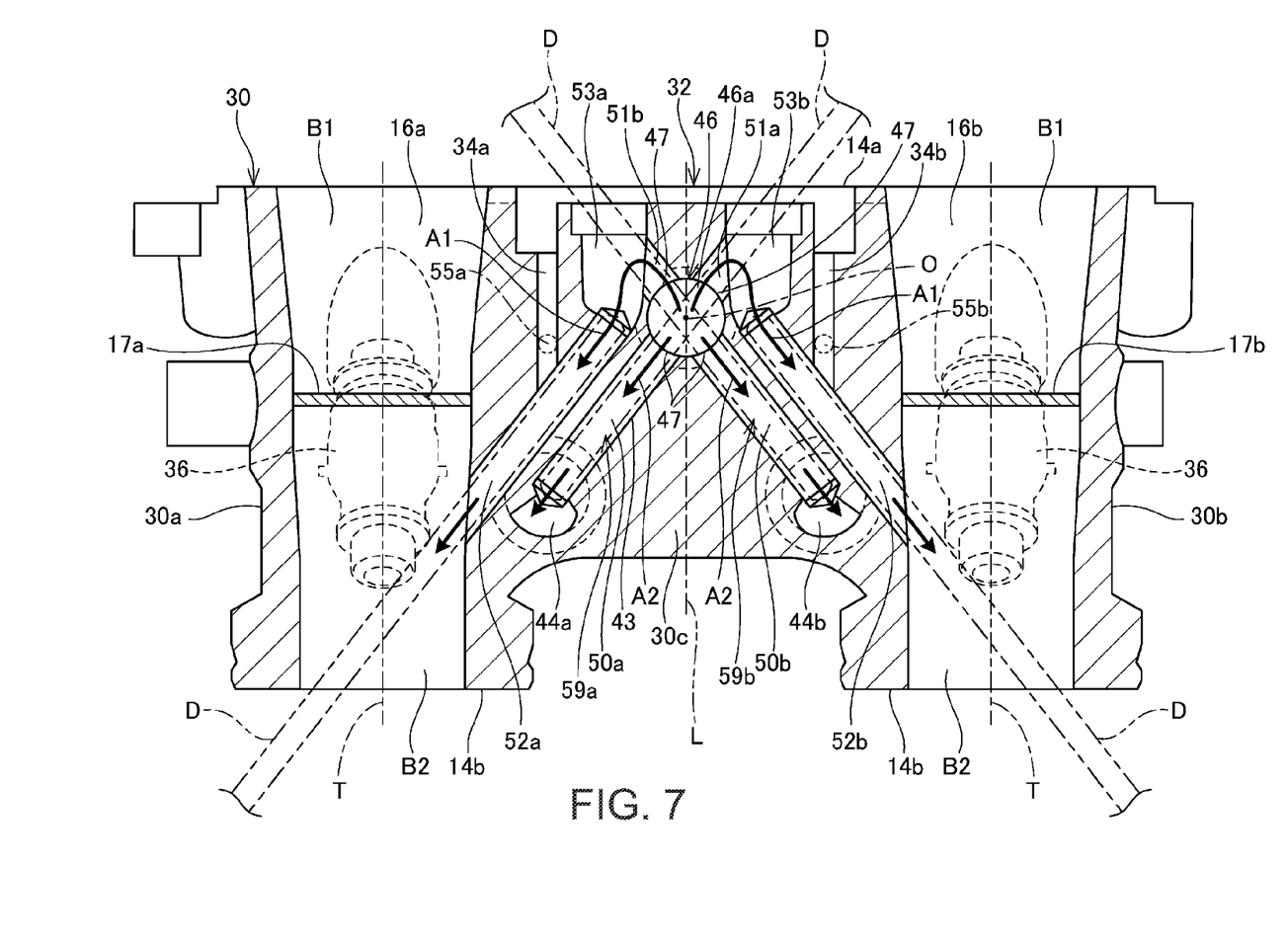
FIG. 7 is a cross-sectional view taken along a line VII-VII in FIG. 5.

The throttle bores 16a, 16b are intake passages having a circular cross section through which air to be supplied to the engine passes, and butterfly-type throttle valves 17a, 17b, which opens or closes the throttle bore 16a, 16b, are arranged at axially intermediate portions of the throttle bores 16a, 16b. The throttle bores 16a, 16b include upstream portions B1 arranged upstream of the throttle valves 17a, 17b (FIG. 7) and downstream portions B2 arranged downstream of the throttle valves 17a, 17b (FIG. 7). The throttle bores 16a, 16b are formed into a tapered shape such that as the throttle bores 16a, 16b extend toward a downstream side, an inner diameter of the throttle bores 16a, 16b is reduced.

The throttle valves 17a, 17b are rotatably supported on one valve shaft 18 which penetrates the throttle bores 16a, 16b in the direction perpendicular to axes T of the throttle bores 16a, 16b. A throttle drum 18a is arranged on one end of the valve shaft 18 which projects frontward from the throttle bore 16a, and the throttle valves 17a, 17b are opened or closed when the throttle drum 18a is rotated through a wire (not shown in the drawing) which is driven in response to an acceleration operation performed by a driver. A throttle position sensor 19 which detects the degree of opening of the throttle valves 17a, 17b based on a rotational position of the valve shaft 18 is arranged on the other end of the valve shaft 18 which projects rearward from the throttle bore 16b.

The throttle body 15 includes a pair of throttle bores 20a, 20b which is connected to cylinders of the other bank respectively as integral parts thereof. That is, in the throttle body 15, in a throttle body main portion 31 made of a light alloy such as an aluminum alloy, the plurality of throttle bores 20a, 20b are integrally formed parallel to each other in a penetrating manner.

The throttle body main portion 31 includes cylinder portions 31a, 31b in which the throttle bores 20a, 20b are formed, and a block-shaped connecting portion 31c that connects the cylinder portions 31a, 31b with each other.

Figure 9:
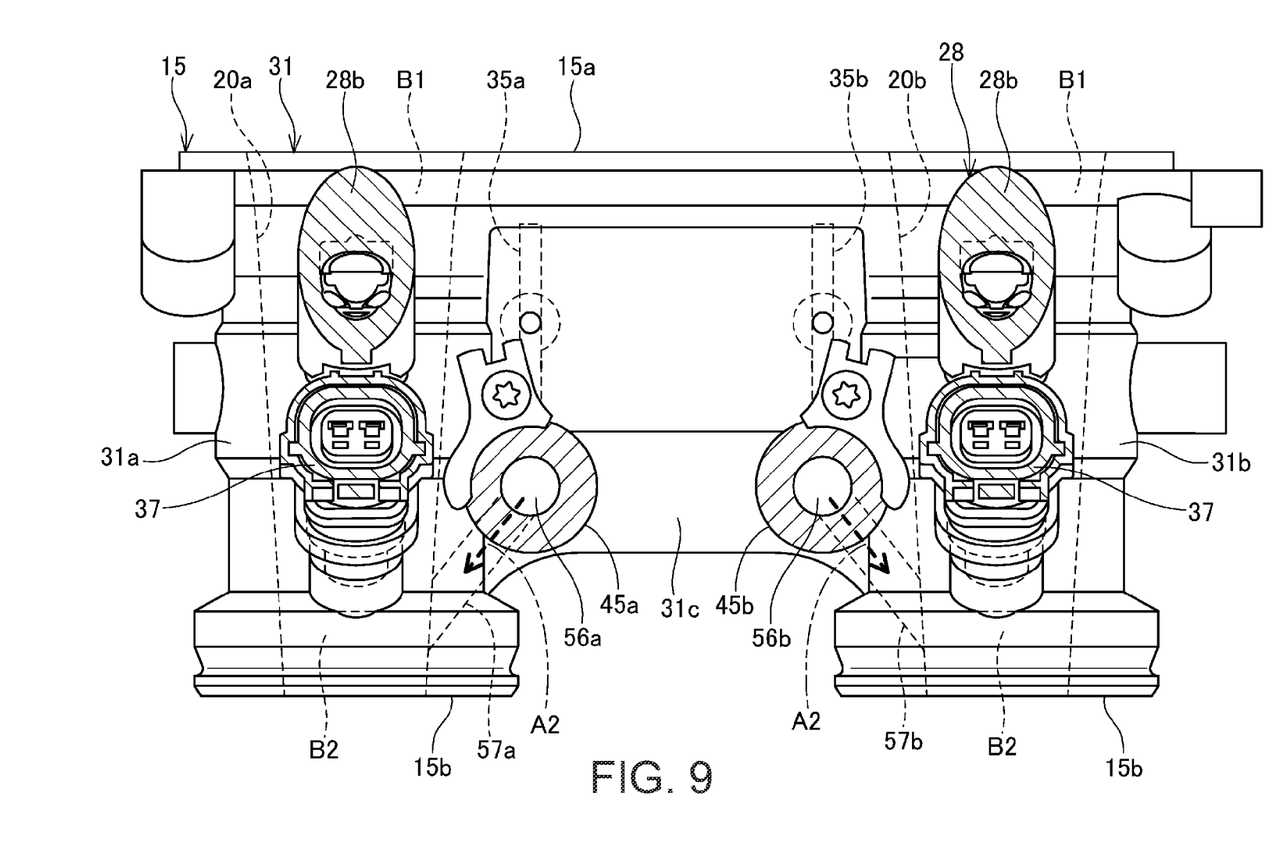
FIG. 9 is a cross-sectional view taken along a line IX-IX in FIG. 2.

The throttle bores 20a, 20b are intake passages having a circular cross section through which air to be supplied to the engine passes, and butterfly-type throttle valves 21a, 21b, which open or close the throttle bores 20a, 20b, are arranged at axially intermediate portions of the throttle bores 20a, 20b. The throttle bores 20a, 20b include upstream portions B1 arranged upstream of the throttle valves 21a, 21b (FIG. 9) and downstream portions B2 arranged downstream of the throttle valves 21a, 21b (FIG. 9). The throttle bores 20a, 20b are formed into a tapered shape such that as the throttle bores 20a, 20b extend toward a downstream side, an inner diameter of the throttle bores 20a, 20b is reduced. The throttle valves 21a, 21b are rotatably supported on one valve shaft 22 that penetrates the throttle bores 20a, 20b in the direction perpendicular to axes of the throttle bores 20a, 20b. The valve shaft 22, which projects frontward from the throttle bore 20a, is connected to the valve shaft 18 by way of a connecting body 22a so that the throttle valves 21a, 21b are opened or closed in synchronism with the throttle valves 17a, 17b.

The throttle body 14 and the throttle body 15 are integrally connected to each other by plate-shaped connecting members 23, 23 which extend between side portions of the throttle bodies 14, 15.

Idle air screws 24a, 24b, 25a, 25b which can adjust amounts of air supplied to the throttle bores 16a, 16b, 20a, 20b respectively during an idling operation of the engine are arranged on outer side surfaces of the connecting portions 30c, 31c of the throttle bodies 14, 15.

By arranging the throttle body 14 and the throttle body 15 in a spaced-apart manner from each other, a space S where parts can be arranged is formed between the throttle body 14 and the throttle body 15.

Injectors 36, 36, which inject fuel into the throttle bores 16a, 16b, are mounted on side surfaces of the cylinder portions 30a, 30b in the space S. Injectors 37, 37, which inject fuel into the throttle bores 20a, 20b, are mounted on a side surface of the cylinder portions 31a, 31b in the space S. Each of the injectors 36, 37 are formed into a cylindrical shape, and is arranged in a downwardly inclined manner such that as an axis of each injectors 36, 37 extends toward a downstream side, the injectors 36, 37 approach the centers of the throttle bores 16a, 16b, 20a, 20b.

Figure 4:
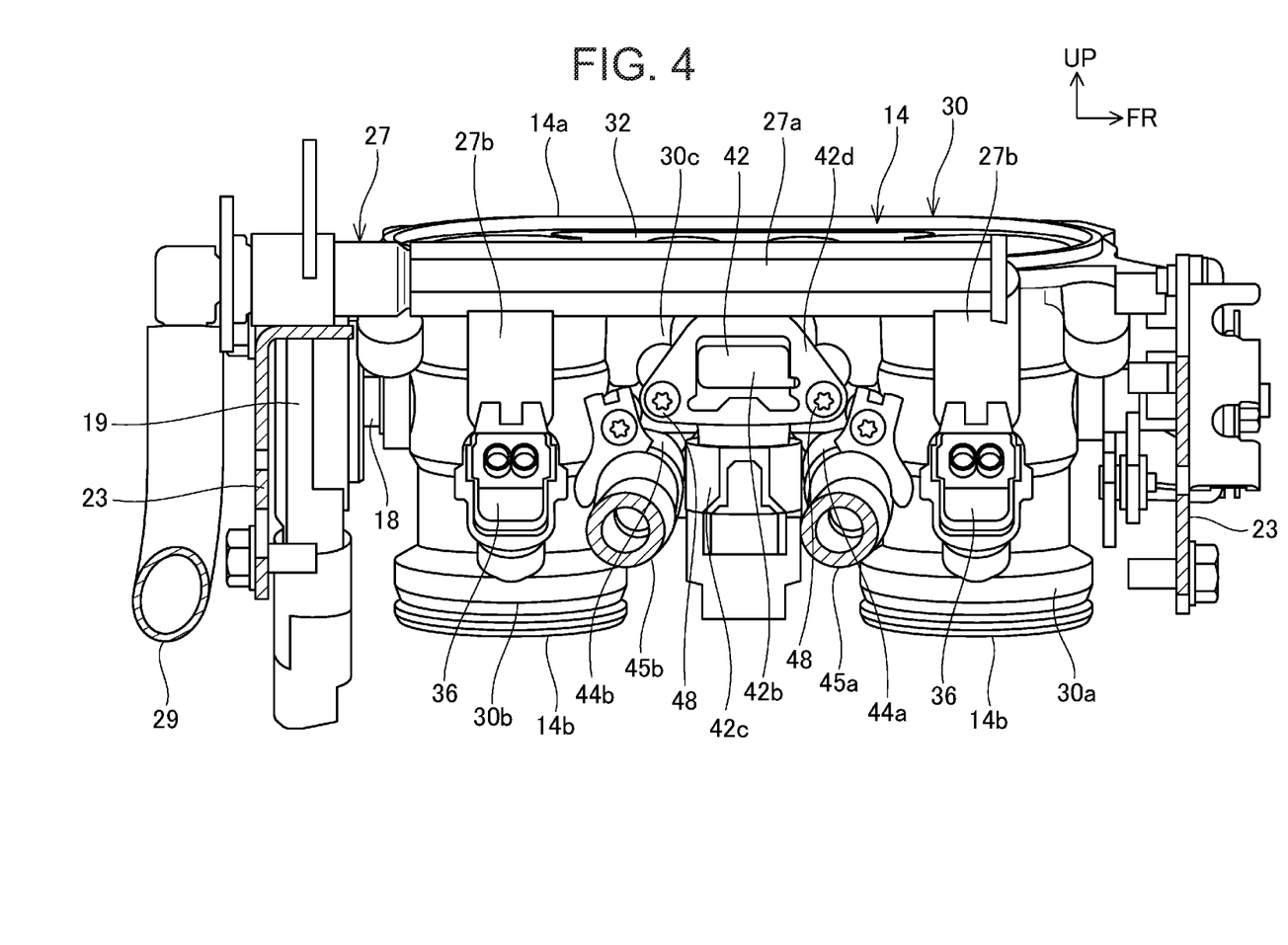
FIG. 4 is a cross-sectional view taken along a line IV-IV in FIG. 2.

As shown in FIG. 2 and FIG. 4, within the space S, a delivery pipe 27, which is connected to the injectors 36, 36, is provided in the vicinity of an inner side surface of the throttle body 14. The delivery pipe 27 extends in the longitudinal direction of the vehicle above the injectors 36, 36 approximately parallel to the valve shaft 18. The delivery pipe 27 includes a main pipe 27a, which extends along an upstream end 14a of the throttle body 14, and branch pipes 27b, which are branched from the main pipe 27a and are connected to the injectors 36, 36.

Within the space S, a delivery pipe 28, which is connected to the injectors 37, 37, is provided in the vicinity of an inner side surface of the throttle body 15. The delivery pipe 28 extends in the longitudinal direction of the vehicle above the injectors 37, 37 approximately parallel to the valve shaft 22. The delivery pipe 28 includes a main pipe 28a, which extends along an upstream end 15a of the throttle body 15, and branch pipes 28b, which are branched from the main pipe 28a and are connected to the injectors 37, 37.

A fuel supply tube 29, which extends from a fuel tank (not shown in the drawing), is arranged behind the throttle bodies 14, 15. The fuel supply tube 29 is connected to rear end portions of the delivery pipes 27, 28 and supplies fuel to the delivery pipes 27, 28.

Recessed portions 32, 33 which are indented toward a downstream side of an intake air flow are formed on upper surfaces of the connecting portions 30c, 31c of the throttle bodies 14, 15 (FIG. 2), and the recessed portions 32, 33 are connected to the inside of the air cleaner box 10 independently from the throttle bores 16a, 16b, 20a, 20b. Idle screw air passages 34a, 34b, 35a, 35b for finely adjusting an intake amount during an idling operation of the engine are formed in the recessed portions 32, 33 corresponding to the throttle bores 16a, 16b, 20a, 20b respectively.

Figure 5:
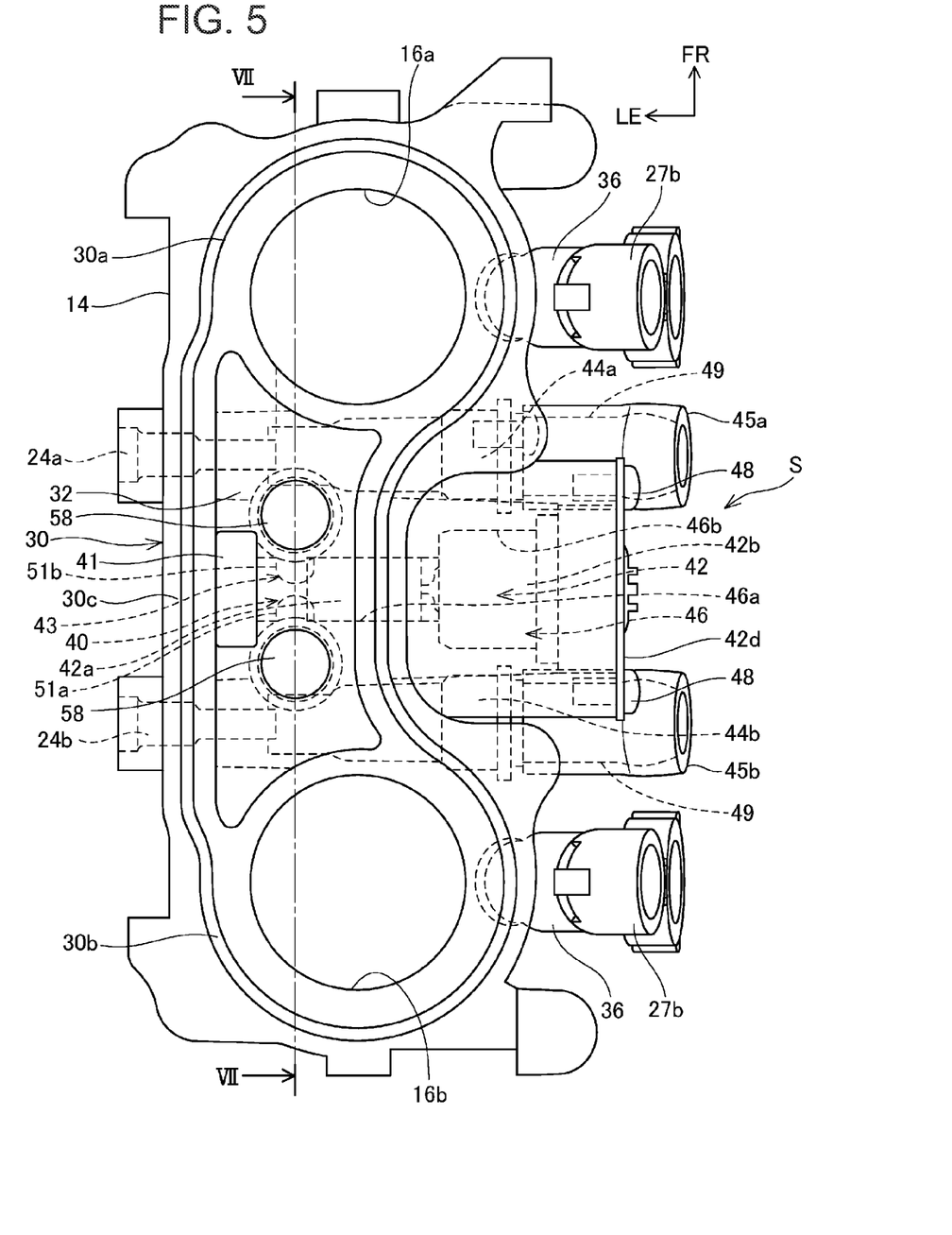
FIG. 5 is a plan view of the throttle body as viewed from above.

FIG. 5 is a plan view of the throttle body 14 as viewed from above. In FIG. 5, the throttle valves 17a, 17b and the like are omitted.

To explain the constitution in conjunction with FIG. 2 to FIG. 5, the air intake device 1 includes an air bypass mechanism 40 that supplies idle air for the idling operation to an area downstream of the throttle valves 17a, 17b, 21a, 21b by bypassing the throttle valves 17a, 17b, 21a, 21b during an idling operation where the throttle valves 17a, 17b, 21a, 21b are closed.

The air bypass mechanism 40 is provided to one throttle body 14 and includes: an idle air intake port 41 through which air is taken in independently from the throttle bores 16a, 16b; a control valve 42 (idle air control valve) that controls a supply amount of air taken in through the idle air intake port 41; a bypass passage 43 (FIG. 5) that allows air which passes through the control valve 42 to bypass the throttle valves 17a, 17b, 21a, 21b; bypass ports 44a, 44b that allow a portion of air which pass the bypass passage 43 to flow into the other throttle body 15 side; and bypass hoses 45a, 45b that connect the bypass ports 44a, 44b to the throttle body 15.

Figure 6:
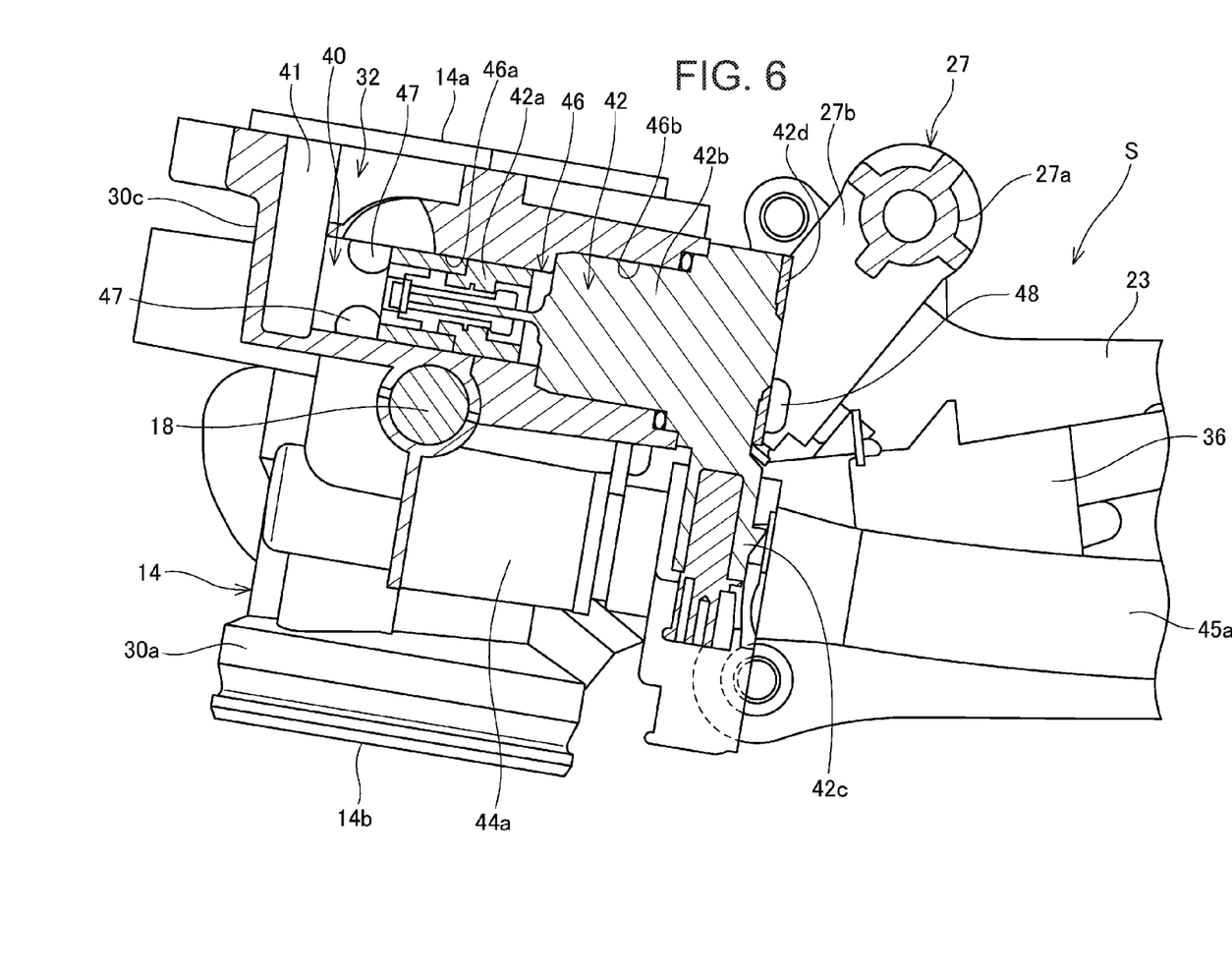
FIG. 6 is a cross-sectional view taken along a line VI-VI in FIG. 2.

As shown in FIG. 5 and FIG. 6, the idle air intake port 41 is formed in the recessed portion 32 that is formed on the connecting portion 30c of the throttle body 14. The idle air intake port 41 is a hole that extends toward a downstream side on a side opposite to the space S, and is formed in the connecting portion 30c at the widthwise center of the connecting portion 30c.

A valve accommodating hole 46 (control valve accommodating hole), which is formed from the space S side and has a distal end thereof communicated with the idle air intake port 41, is formed on an upstream end 14a side of the connecting portion 30c at a widthwise center portion of the connecting portion 30c. The valve accommodating hole 46 includes: a valve accommodating hole portion 46a that communicates with the idle air intake port 41; and a motor support hole portion 46b that has a diameter larger than a diameter of the valve accommodating hole portion 46a and is formed from the space S side. A plurality of (four in this embodiment) communication holes 47 that communicate with the bypass passage 43 are formed in an inner peripheral surface of the valve accommodating hole portion 46a in the circumferential direction.

The control valve 42 includes: a cylindrical valve body 42a that is accommodated in the valve accommodating hole portion 46a and opens or closes the communication holes 47; a drive motor 42b that is accommodated in the motor support hole portion 46b and moves the valve body 42a in the axial direction; and a terminal connecting portion 42c that extends in the space S toward the downstream side from an outer end portion of the drive motor 42b. The valve body 42a is connected to a rotary shaft of the drive motor 42b, and changes the degree of opening of the communication holes 47 when the position of the valve body 42a in the axial direction in the valve accommodating hole portion 46a is changed due to the rotation of the drive motor 42b. The terminal connecting portion 42c is connected to an ECU (not shown in the drawing) of a motorcycle, and the degree of opening of the communication holes 47 is changed based on an instruction from the ECU.

The control valve 42 is fixed to connecting portion 30c such that the control valve 42 is inserted into the valve accommodating hole 46 from a space S side, and a fixing plate 42d arranged at an outer end portion of the drive motor 42b is fastened to the connecting portion 30c using bolts 48 that are inserted from a space S side.

Figure 8:
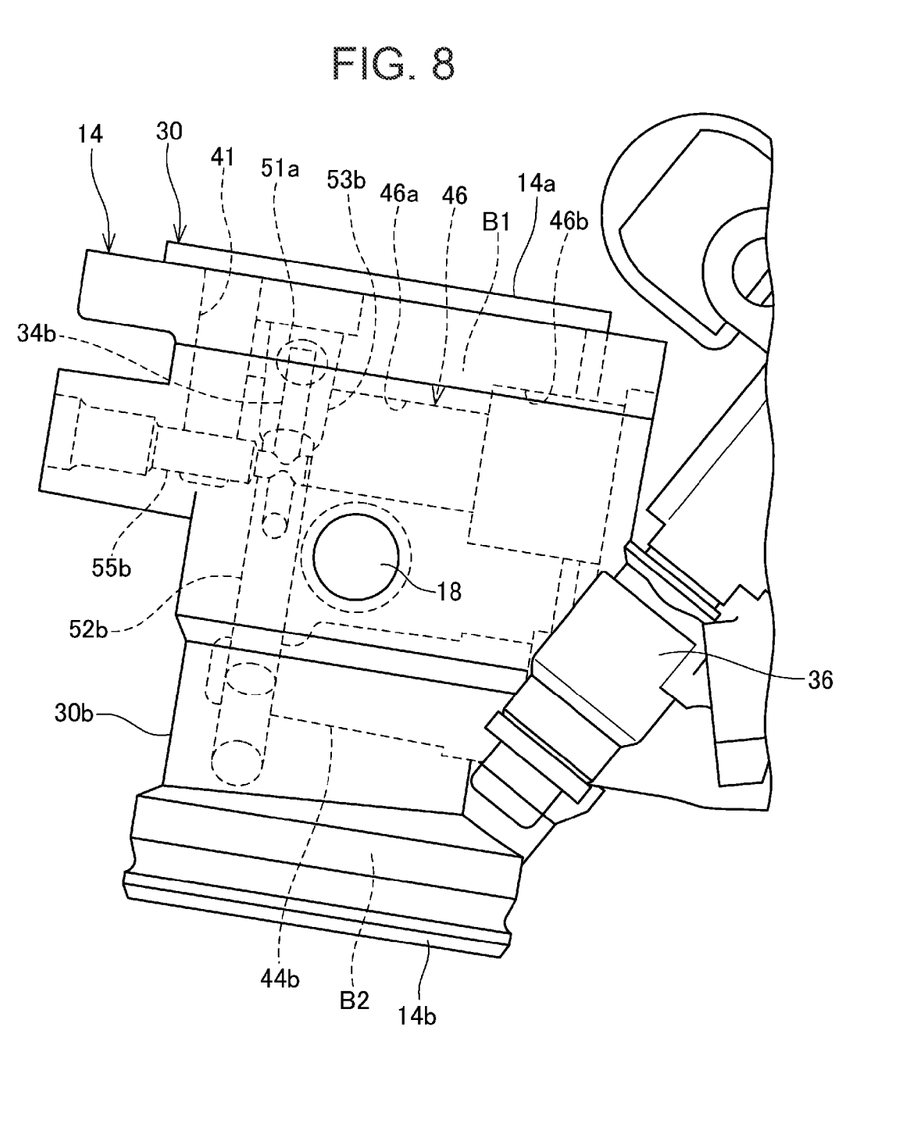
FIG. 8 is a view of the throttle body as viewed from a rear side.

FIG. 7 is a cross-sectional view taken along a line VII-VII in FIG. 5. FIG. 8 is a view of the throttle body 14 as viewed from a rear side. In FIG. 7 and FIG. 8, the control valve 42 is omitted.

As shown in FIG. 5, FIG. 7 and FIG. 8, the bypass ports 44a, 44b are formed in the connecting portion 30c on a side closer toward a downstream end 14b side than the valve accommodating hole 46 is, wherein the bypass port 44a is arranged between the valve accommodating hole 46 and the throttle bore 16a, and the bypass port 44b is arranged between the valve accommodating hole 46 and the throttle bore 16b.

The bypass ports 44a, 44b are holes which extend into the inside of the connecting portion 30c from a space S side, and extend parallel to the valve accommodating hole 46. Distal ends of the bypass ports 44a, 44b are arranged at positions substantially equal to a distal end of the valve accommodating hole 46 as viewed in a plan view. A hose connecting pipe 49 (FIG. 5) which projects into the space S is connected to the bypass ports 44a, 44b respectively, and bypass hoses 45a, 45b have one end thereof connected to the hose connecting pipe 49 and the other end thereof connected to the throttle body 15.

The throttle body main portion 30 is a part that is formed by casting using a mold, and the bypass passage 43 is formed in the connecting portion 30c as an as-cast hole during casting, or is formed by machining after casting.

The bypass passage 43 includes: first bypass passages 50a, 50b that extend obliquely toward a downstream end 14b side from the valve accommodating hole portion 46a, and make the valve accommodating hole portion 46a and the bypass ports 44a, 44b communicate with each other; second bypass passages 51a, 51b that are arranged coaxially with the first bypass passages 50a, 50b and extend obliquely toward an upstream end 14a side from the valve accommodating hole portion 46a; third bypass passages 52a, 52b that extend parallel to the first bypass passages 50a, 50b and have one ends thereof in communication with the throttle bores 16a, 16b; and communication passages 53a, 53b that make the other ends of the third bypass passages 52a, 52b and the second bypass passages 51a, 51b communicate with each other. The respective communication holes 47 are holes which make the first bypass passages 50a, 50b and the second bypass passages 51b, 51a communicate with the valve accommodating hole portion 46a.

The bypass passages 43 are formed in a right left symmetry with respect to a center line L that extends parallel to the axis T and passes the center O of the valve accommodating hole portion 46a. Further, the first bypass passages 50a, 50b, the second bypass passages 51a, 51b, the third bypass passages 52a, 52b and the communication passages 53a, 53b are arranged such that center lines of the respective passages extend on the same plane.

In the connecting portion 30c, the idle screw air passages 34a, 34b, which make the recessed portion 32 communicate with the third bypass passages 52a, 52b, and idle air screw holding holes 55a, 55b, which are provided approximately orthogonal to the idle screw air passages 34a, 34b and communicate with the outside, are formed. Further, the idle air screws 24a, 24b (FIG. 3) are held in the idle air screw holding holes 55a, 55b in an extendable and retractable manner with respect to the idle screw air passages 34a, 34b. When the idle air screws 24a, 24b is operated so that flow passage areas of the idle screw air passages 34a, 34b are changed, an amount of air supplied to the engine through the idle screw air passages 34a, 34b is adjusted.

The communication passages 53a, 53b are holes that extend into the communication portion 30c from an upstream end 14a side, and extend parallel to the axes T of the throttle bores 16a, 16b. The communication passages 53a, 53b are arranged on both sides of the valve accommodating hole portion 46a and, as viewed in a side view which is shown in FIG. 7, distal ends of the communication passages 53a, 53b are positioned in the vicinity of the center O. The communication passages 53a, 53b extend parallel to the axes T, and are formed as an as-cast hole during casting when the throttle bores 16a, 16b are formed by casting. Accordingly, the communication passages 53a, 53b can be easily formed. Opening holes of the communication passages 53a, 53b on the upstream end 14a side are closed by closing members 58 which are provided after forming the throttle body main portion 30 by casting (FIG. 5). Further, the bypass ports 44a, 44b and the valve accommodating hole 46 are arranged parallel to each other, and are formed by casting simultaneously with the formation of the throttle body main portion 30. Accordingly, the bypass ports 44a, 44b and the valve accommodating hole 46 can be easily manufactured.

While the molds for forming the throttle bores 16a, 16b are molds that are opened or closed in the axes T direction, molds used for forming the bypass port 44a, 44b and the valve accommodating hole 46 as as-cast holes by casting are molds that are movable in the direction perpendicular to the axes T.

The first bypass passage 50a and the second bypass passage 51a are coaxially arranged on one straight line. This straight passage extends obliquely with respect to the axis T from the communication passage 53b on a throttle bore 16b side, passes the center O and penetrates the valve accommodating hole portion 46a, and communicates with the bypass port 44a on the throttle bore 16a side.

The first bypass passage 50b and the second bypass passage 51b are coaxially arranged on one straight line. This straight passage extends obliquely with respect to the axis T from the communication passage 53a on a throttle bore 16a side, passes the center O and penetrates the valve accommodating hole portion 46a, and communicates with the bypass port 44b on the throttle bore 16b side.

That is, the first bypass passages 50a, 50b and the second bypass passages 51b, 51a form passages that define an approximately X shape such that the first bypass passages 50a, 50b and the second bypass passages 51b, 51a intersect with each other at the valve accommodating hole portion 46a.

Opening holes of the second bypass passages 51a, 51b on the upstream end 14a side are closed by the closing members 58, which are provided after forming the throttle body main portion 30 by casting (FIG. 5).

The third bypass passage 52a is arranged between the first bypass passage 50a and the second bypass passage 51b, extends approximately parallel to the first bypass passage 50a, and makes the communication passage 53a communicate with the downstream portion B2 of the throttle bore 16a.

The third bypass passage 52b is arranged between the first bypass passage 50b and the second bypass passage 51a, extends approximately parallel to the first bypass passage 50b, and makes the communication passage 53b communicate with the downstream portion B2 of the throttle bore 16b.

In this embodiment, the valve accommodating hole portion 46a is formed at the center of the connecting portion 30c, the first bypass passages 50a, 50b extend obliquely toward a downstream portion B2, B2 side of the throttle bores 16a, 16b, which are arranged adjacent to the first bypass passages 50a, 50b from the valve accommodating hole portion 46a, and communicate with the bypass ports 44a, 44b, and the third bypass passages 52a, 52b, which communicate with the first bypass passages 50a, 50b through the second bypass passages 51b, 51a, and the communication passages 53a, 53b extend obliquely toward a downstream portion B2, B2 side approximately in parallel to the first bypass passages 50a, 50b from an area in the vicinity of the valve accommodating hole portion 46a, and communicate with the downstream portions B2, B2. Accordingly, the first bypass passages 50a, 50b and the third bypass passages 52a, 52b can be easily formed in a compact manner, and the bypass ports 44a, 44b can be formed in the downstream portions B2, B2 side of the connecting portion 30c and hence, the bypass hoses 45a, 45b can be connected to the downstream B2, B2 side of the connecting portion 30c. Due to such a constitution, a space can be ensured around the connecting portion 30c on the upstream B1, B1 side so that it is possible to increase the degree of freedom in arranging the delivery pipe 27 and the injectors 36, 36, which are arranged outside the throttle body 14. Further, the delivery pipe 27 is arranged on a side closer to the upstream end 14a side than the bypass ports 44a, 44b are and hence, the bypass ports 44a, 44b do not interfere with the delivery pipe 27, thus realizing an efficient layout of the delivery pipe 27.

The idle screw air passage 34a is arranged parallel to the axis T between the throttle bore 16a and the communication passage 53a. The idle screw air passage 34b is arranged parallel to the axis T between the throttle bore 16b and the communication passage 53b. The idle screw air passages 34a, 34b are arranged on the same plane as the bypass passage 43.

FIG. 9 is a cross-sectional view taken along a line IX-IX in FIG. 2.

As shown in FIG. 9, in the other throttle body 15, the connecting portion 31c has bypass air intake ports 56a, 56b to which the other ends of the bypass hoses 45a, 45b are connected on a space S side. The bypass air intake ports 56a, 56b are communicated with the downstream portions B2 of the throttle bores 20a, 20b by way of air passages 57a, 57b, which extend toward a downstream end 15b side.

The throttle body 15 has a profile substantially equal to a profile of the throttle body 14, and the bypass air intake ports 56a, 56b are formed at positions substantially equal to positions of the bypass ports 44a, 44b of the throttle body 14. Due to such a constitution, the delivery pipe 28 can be arranged on a side closer to an upstream end 15a side than the bypass air intake ports 56a, 56b are and hence, it is possible to realize an efficient layout of the delivery pipe 28.

When the control valve 42 (FIG. 6) is opened, air in the air cleaner box 10 flows into the valve accommodating hole portion 46a through the idle air intake port 41 so that the air can pass through the respective communicating holes 47.

As shown in FIG. 7, idle air A1 which has flowed into the second bypass passages 51b, 51a through the communication holes 47, 47 flows, into the third bypass passages 52a, 52b through the communication passages 53a, 53b, then, flows into the downstream portions B2 of the throttle bores 16a, 16b arranged adjacent to the control valve 42, and is supplied to one bank of the engine as air for an idling operation.

Idle air A2, which has flowed into the first bypass passages 50b, 50a through the communication holes 47, 47, flows into the bypass hoses 45a, 45b through the bypass ports 44a, 44b, reaches the bypass air intake ports 56a, 56b of the throttle body 15, then, flows into the downstream portions B2 of the throttle bores 20a, 20b through the air passages 57a, 57b, and is supplied to the other bank of the engine as air for an idling operation.

The first bypass passage 50a, the second bypass passage 51a, and the third bypass passage 52a are formed by machining using a drill.

To explain in more detail, a drill D (FIG. 7) is obliquely inserted into the communication passage 53a after the throttle body main portion 30 is formed by casting, and the first bypass passage 50a and the second bypass passage 51a are formed in the same step. That is, the first bypass passage 50a and the second bypass passage 51a are formed at one time thus forming a compound bypass passage 59a (bypass passage) which extends on one straight line.

Further, after the compound bypass passage 59a is formed, the throttle body main portion 30 is rotated by 180°, and the same drill D is obliquely inserted into the throttle bore 16a thus forming the third bypass passage 52a. Here, for facilitating the understanding of the drawing, the drill D is described in the drawing with a diameter smaller than an actual diameter.

After performing the machining with the drill D, the closing member 58 is mounted on the communication passage 53a so that an opening hole of the communication passage 53a and an opening hole of the second bypass passage 51a on a side from which the drill D is inserted are closed.

Further, the idle screw air passages 34a, 34b are formed by the drill which is inserted from the recessed portion 32 side.

In this manner, the compound bypass passage 59a and the third bypass passage 52 are formed such that these passages are arranged parallel to each other and can be formed by machining from directions opposite to each other. Accordingly, the steps for forming the compound bypass passage 59a and the third bypass passage 52a by machining can be easily carried out by merely rotating the throttle body main portion 30 by 180° and hence, the constitution of a jig for supporting the throttle body main portion 30 at the time of machining can be simplified.

Further, the compound bypass passage 59a and the third bypass passage 52a are formed on the same plane and hence, these passages can be easily formed by machining. Further, the compound bypass passage 59a and the third bypass passage 52a have the same diameter so that these passages can be formed using the same drill D and hence, the machining operation can be carried out easily.

In the same manner, the first bypass passage 50b and the second bypass passage 51b constitute a compound bypass passage 59b (bypass passage) that can be formed at one time and extends on one straight line. The compound bypass passage 59b and the third bypass passage 52b can be also easily formed in the same manner as the compound bypass passage 59a and the third bypass passage 52a.

As has been explained heretofore, according to the embodiment to which the invention is applied, the throttle body device 11 includes: the control valve 42 which is arranged between the throttle bores 16a, 16a of one throttle body 14; the plurality of compound bypass passages 59a, 59b and the third bypass passages 52a, 52b, which are opened or closed by the control valves 42 and extend to downstream sides of the throttle bores 16a 16b; and the bypass ports 44a, 44b that are arranged between the plurality of throttle bores 16a, 16b where the control valve 42 is arranged, and supply idle air to the throttle bores 20a, 20b of the other throttle body 15 which is spaced apart from the control valve 42. The compound bypass passages 59a, 59b and the third bypass passages 52a, 52b are arranged parallel to each other, the third bypass passages 52a, 52b are communicated with the throttle bores 16a, 16b that are arranged adjacent to the control valve 42, and the compound bypass passages 59a, 59b communicate with the bypass ports 44a, 44b. Due to such a constitution, a plurality of compound bypass passages 59a, 59b and the third bypass passages 52a, 52b can be easily formed in a compact manner, and it is possible to make the third bypass passages 52a, 52b that extend to the downstream side communicate with the bypass ports 44a, 44b so that the bypass ports 44a, 44b can be easily formed on a downstream side of the throttle bores 16a, 16b. Accordingly, the bypass ports 44a, 44b do not interfere with the delivery pipe 27 and hence, it is possible to increase the degree of freedom in arranging the delivery pipe 27 which is arranged outside the throttle body 14.

Further, the bypass passage 43 includes the first bypass passages 50a, 50b, which extend toward the downstream side of the throttle bores 16a, 16b from the valve accommodating hole 46 in which the control valve 42 is accommodated, the second bypass passages 51a, 51b, which are provided on the same axis as the first bypass passages 50a, 50b, and extend toward the upstream side of the throttle bores 16a, 16b from the valve accommodating hole 46, and the third bypass passages 52a, 52b, which extend parallel to the first bypass passages 50a, 50b. The second bypass passages 51b, 51a communicate with the third bypass passages 52a, 52b and hence, the first bypass passage 50a, 50b and the second bypass passages 51b, 51a can be easily formed, and it is possible to make the idle air A1 which has flowed into the upstream side of the throttle bores 16a, 16b through the second bypass passages 51b, 51a flow toward the downstream side through the third bypass passages 52a, 52b and hence, the idle air A1 can be easily supplied by easily forming the third bypass passages 52a, 52b in a compact manner.

Further, on the upstream side of the throttle body 14, the communication passages 53a, 53b, which extend parallel to the throttle bores 16a, 16b and communicate with the second bypass passages 51b, 51a, are formed, and the third bypass passages 52a, 52b communicate with the communication passages 53a, 53b. Accordingly, even when the third bypass passages 52a, 52b are arranged close to the first bypass passages 50a, 50b, the third bypass passages 52a, 52b can communicate with the second bypass passages 51b, 51a through the communication passages 53a, 53b without interfering with the valve accommodating hole 46 so that the bypass passage 43 can be formed in a compact manner.

Further, the communication passages 53a, 53b extend parallel to the throttle bores 16a, 16b, and are formed by casting together with the throttle bores 16a, 16b and hence, the communication passages 53a, 53b can be easily formed.

Further, the idle screw air passages 34a, 34b are formed between the throttle bores 16a, 16b and the communication passages 53a, 53b and parallel to the throttle bores 16a, 16b and hence, the idle screw air passages 34a, 34b can be formed in a compact manner so that a size of the throttle body 14 can be reduced.

Further, the valve accommodating hole 46 and the bypass ports 44a, 44b are formed parallel to each other as as-cast holes by casting and hence, the valve accommodating hole 46 and the bypass ports 44a, 44b can be easily formed in a compact manner so that a size of the throttle body 14 can be reduced.

Further, each throttle bores 16a, 16b of the throttle body 14 is provided with the injectors 36, 36 which inject fuel into the throttle bores 16a, 16b, the delivery pipe 27 through which fuel is supplied to the injectors 36, 36 is provided, and the bypass ports 44a, 44b are arranged more on the downstream side of the throttle body 14 than the delivery pipe 27 is. Accordingly, the bypass ports 44a, 44b do not interfere with the delivery pipe 27 so that the degree of freedom in arranging the delivery pipe 27 can be enhanced.

Here, the above-mentioned embodiment merely indicates one mode to which the invention is applied, and the invention is not limited to the above-mentioned embodiment.

In the above-mentioned embodiment, the bypass ports 44a, 44b are explained as members that supply idle air to the throttle bores 20a, 20b of the other throttle body 15 which is spaced apart from the control valve 42. However, the invention is not limited to the above-mentioned embodiment and, for example, one single throttle body may include a plurality of (three or more) throttle bores that are arranged parallel to each other, an idle air control valve are arranged between one pair of throttle bores arranged adjacent to each other, and a bypass port may supply idle air to the remaining throttle bores that are spaced apart from the idle air control valve and do not constitute the above-mentioned pair of throttle bores.

DESCRIPTION OF REFERENCE NUMERALS AND SIGNS

14: throttle body
16a, 16b: throttle bore
20a, 20b: throttle bore (throttle bore which is separated from idle air control valve)
27: delivery pipe
34a, 34b: idle screw air passage
36, 36: injector
42: control valve
44a, 44b: bypass port
46: valve accommodating hole (control valve accommodating hole)
50a, 50b: first bypass passage
51a, 51b: second bypass passage
52a, 52b: third bypass passage (bypass passage)
53a, 53b: communication passage
59a: compound bypass passage (bypass passage)

What is claimed is:

1. A throttle body structure comprising: a plurality of throttle bores where at least two or more throttle valves are arranged parallel to each other; an idle air control valve that is provided between the plurality of throttle bores; a plurality of bypass passages that are opened or closed by the idle air control valve and extend toward a downstream side of the throttle bores; and bypass ports that are arranged between the plurality of throttle bores where the idle air control valve is arranged, and supply idle air to throttle bores that are spaced apart from the idle air control valve, wherein
the plurality of bypass passages include: first bypass passages that extend toward a downstream side of the throttle bores from a control valve accommodating hole in which the idle air control valve is accommodated and communicate with the bypass ports; second bypass passages that are provided on the same axis as the first bypass passages and extend toward an upstream side of the throttle bores from the control valve accommodating hole; and third bypass passages that are arranged between the first bypass passages and the second bypass passages and extend parallel to the first bypass passages and communicate with the throttle bores, wherein
the second bypass passages and the third bypass passages communicate with each other and the third bypass passages communicate with the first bypass passages through the second bypass passages.

2. The throttle body structure according to claim 1, wherein communication passages that extends parallel to the throttle bores and communicate with the second bypass passages are provided at positions on the upstream side of the throttle bores, and the third bypass passages communicate with the communication passages.

3. The throttle body structure according to claim 2, wherein the communication passages are formed together with the throttle bores as as-cast holes by casting.

4. The throttle body structure according to claim 2, wherein the third bypass passages communicate with the throttle bores arranged adjacent to the idle air control valve, and idle screw air passages are provided between the throttle bores and the communication passages and parallel to the throttle bores.

5. The throttle body structure according to claim 1, wherein the control valve accommodating hole and the bypass ports are formed parallel to each other as as-cast holes by casting.

6. The throttle body structure according to claim 1, wherein injectors that inject fuel to the throttle bores are mounted on the respective throttle bores formed in the throttle body, a delivery pipe that supplies fuel to the injectors is provided, and the bypass ports are arranged more downstream of the throttle body than is the delivery pipe.

* * * * *